United States Patent [19]

Tagawa et al.

[11] Patent Number: 4,903,408
[45] Date of Patent: Feb. 27, 1990

[54] STEEL PLATE CUTTER

[75] Inventors: Itsuo Tagawa, Tokyo; Samon Kanno, Saitama, both of Japan

[73] Assignee: Sangojuuki Co., Ltd., Tokyo, Japan

[21] Appl. No.: 125,541

[22] Filed: Nov. 25, 1987

[30] Foreign Application Priority Data

Nov. 25, 1986 [JP] Japan ................................. 61-278650

[51] Int. Cl.⁴ ............................................. B26B 15/00
[52] U.S. Cl. ......................................... 30/228; 30/134
[58] Field of Search .................. 30/228, 180, 134, 229; 83/609

[56] References Cited

U.S. PATENT DOCUMENTS

| | | |
|---|---|---|
| 3,731,577 | 5/1973 | Swint, Jr. |
| 4,519,135 | 5/1985 | LaBounty ............................. 30/134 |
| 4,541,177 | 9/1985 | Hollander ............................ 30/134 |
| 4,543,719 | 10/1985 | Pandoe ................................ 30/228 |

FOREIGN PATENT DOCUMENTS

| | | |
|---|---|---|
| 959271 | 3/1950 | France . |
| 60-22644 | 2/1985 | Japan . |
| 662286 | 12/1951 | United Kingdom . |
| 2126938 | 4/1984 | United Kingdom . |
| 2157215A | 10/1985 | United Kingdom . |

*Primary Examiner*—Frank T. Yost
*Assistant Examiner*—Willmon Fridie, Jr.
*Attorney, Agent, or Firm*—Lowe, Price, LeBlanc, Becker & Shur

[57] ABSTRACT

A steel plate cutter has a pair of stationary arms arranged with a predetermined gap therebetween, and a movable arm arranged between the stationary arms. An intermediate portion of the movable arm is pivotally supported by the stationary arms. Stationary and movable ends of a hydraulic cylinder are pivotally coupled to the proximal ends of the stationary arms and the movable arm. A pair of base blades that oppose a shearing push blade fixed to the distal end of the movable arm are fixed on the distal ends of the stationary arms. When the movable arm is driven by the hydraulic cylinder to approach and separate from the stationary arms, the shearing push blade of the movable arm enters or escapes from the gap between the base blades of the stationary arms. When the shearing push blade slides between the base blades, it cuts a steel plate in a belt-like strip by coaction with the base blades by a shearing force. The cut strip of the steel plate is bent in a direction away from the steel plate. Therefore, a belt-like space, in which and from which the movable arm can enter and escape, is formed in the steel plate by every cutting operation. When a single cutting operation is completed, the steel plate cutter can smoothly move on the steel plate along the belt-like space while the movable arm faces the belt-like space. As a result, the cutting operation can be easily repeated, and the steel plate can be safely and efficiently cut.

14 Claims, 11 Drawing Sheets

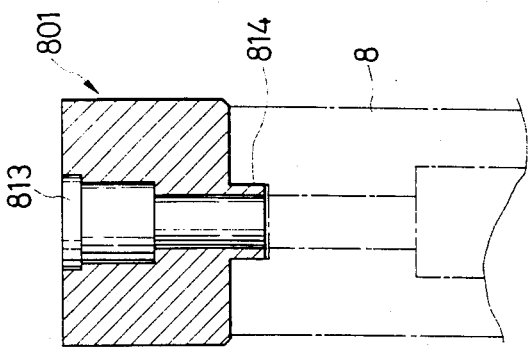
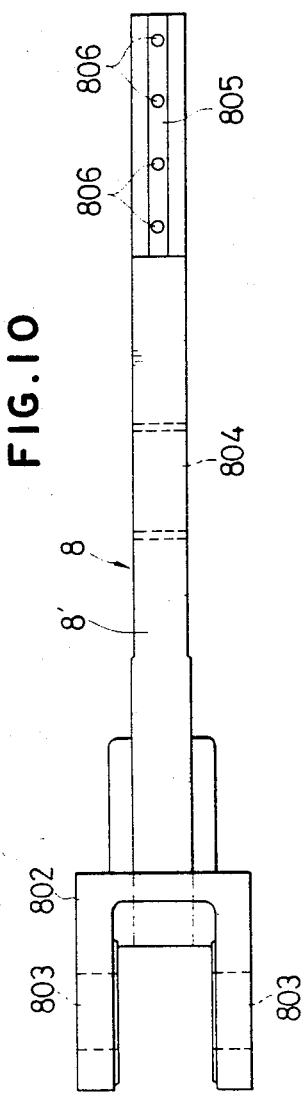
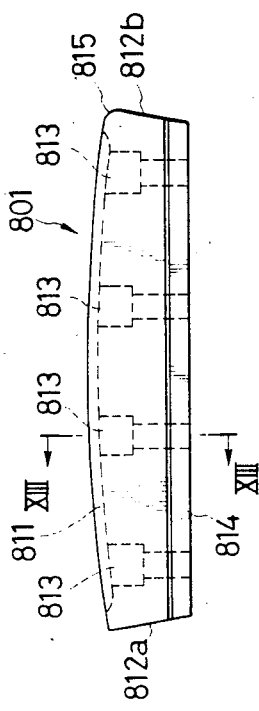
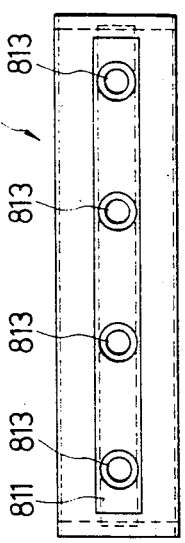

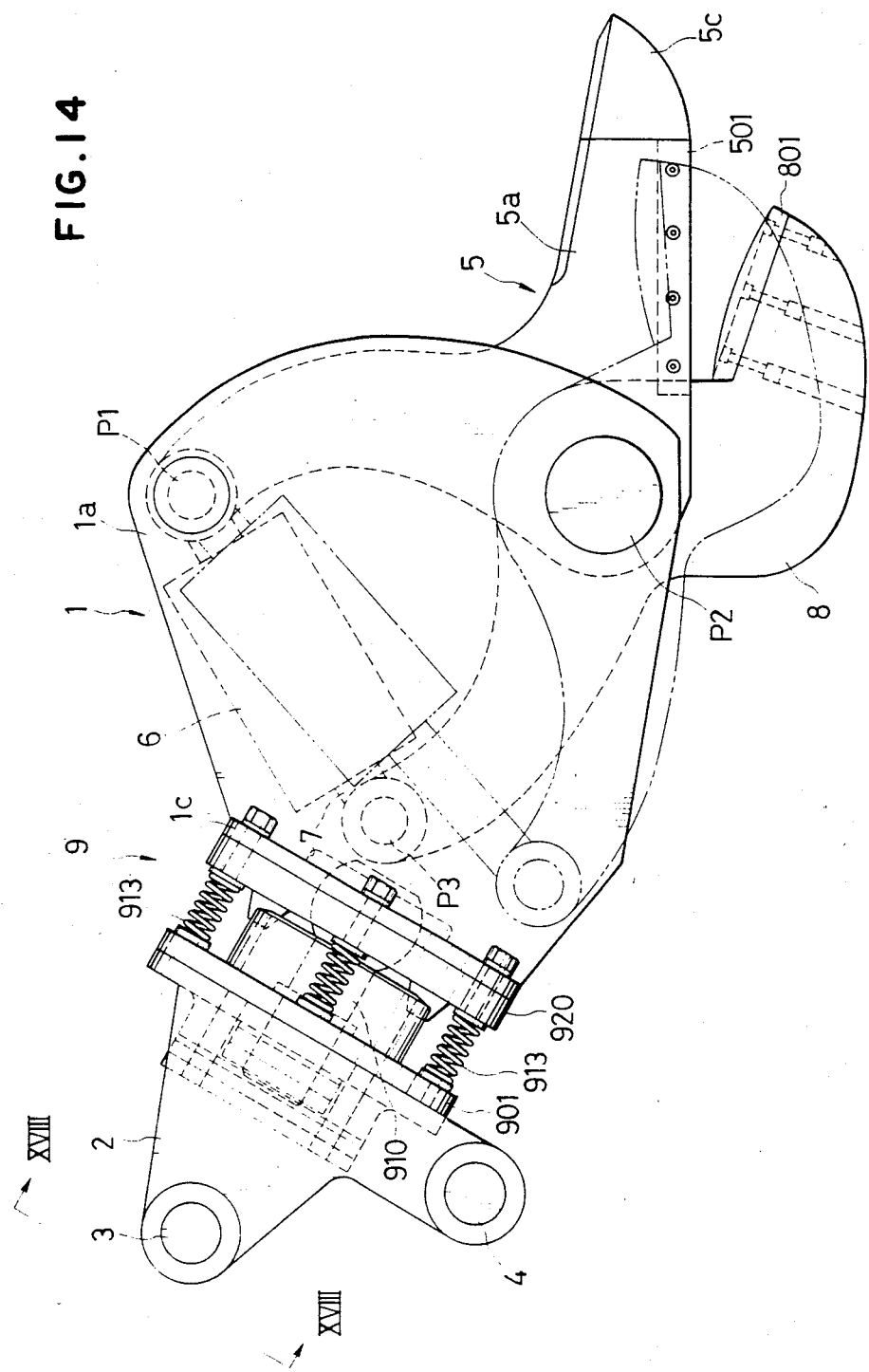

STEEL PLATE CUTTER

FIELD OF THE INVENTION

The present invention relates to a steel plate cutter and, more particularly, to a steel plate cutter for safely and efficiently dismantling a structure, such as a vessel, consisting of steel plates.

BACKGROUND OF THE INVENTION

When a structure, such as a vessel, consisting of steel plates is to be dismantled, a so-called gas cutting method is conventionally used. In this method, oxygen is blown onto a steel plate heated to a high temperature by an oxygen-acetylene gas flame, so that the steel plate is burned and any product obtained by burning is blown off. However, with this gas cutting method, a structure, such as a tanker which may contain a flammable material can catch fire and cause a fire or explosion. Even if the structure does not contain a flammable material, it is dangerous to use a gas flame. When a steel plate is coated, the coating film can catch fire by the gas flame to spread the fire. Oxygen is consumed by burning of the coating film, thus decreasing the gas cutting efficiency. When a steel plate is rusted, the gas cutting efficiency is decreased as well.

In another conventional method, small holes are continuously formed in a steel plate to allow cutting of the steel plate. However, this requires a large amount of labor and is thus not efficient.

SUMMARY OF THE DISCLOSURE

It is an object of the present invention to provide a steel plate cutter which can cut a steel plate safely and efficiently.

The cutter plate according to the present invention comprises a stationary arm having a pair of arm members arranged at a predetermined gap from each other, a movable arm arranged between the arm members, and a hydraulic cylinder. The intermediate portion of the movable arm is pivotally supported by the two arm members. The stationary end of the hydraulic cylinder is pivotally coupled to the proximal ends of the two arm members, and the distal end of the piston rod of the cylinder is pivotally coupled to the proximal end of the movable arm so as to drive the movable arm toward and away from the stationary arm. A shearing push blade is fixed to the distal end of the movable arm. A pair of base blades are fixed to the distal ends of the two arm members so as to respectively oppose the shearing push blade. When the movable arm is driven by the hydraulic cylinder to move toward and away from the two arm members, the shearing push blade of the movable arm enters and escapes from the gap between the base blades of the two arm members. When the shearing push blade slides between the two base blades, it cuts a steel a plate into a belt like strip by a shearing force by coating with the base blades such that the shearing blade advances into the gap corresponding to the cut strip to make a further cut.

The steel plate cutter preferably comprises a bracket member for mounting the cutter to a construction machine, an arm mounting member on which the stationary arm is fixed, and a flexible joint for pivotally mounting the arm mounting member on the bracket member. The joint has a shaft member having one end thereof fixed to either the arm mounting or bracket member and the other end thereof provided with a coupling portion, and a spring means inserted between the arm mounting and bracket members and arranged around the shaft member. The coupling portion of the shaft member is pivotally coupled to a second coupling portion formed on the remaining one of the arm mounting and bracket members. Either the coupling portion of the shaft member or the second coupling portion comprises a spherical coupling member. A spherical hole fitting with the spherical coupling member is formed in the remaining one of the coupling portions. When the stationary arm of the steel plate cutter is urged against a steel plate, the arm mounting member pivots relative to the bracket member as it compresses one side of the spring means and extends the other side thereof, so that the stationary arm is brought into tight contact with the steel plate. As a result, the cutting force of the steel plate cutter acts precisely in the direction of the thickness of the steel plate so that the steel plate can be efficiently cut. When the movable arm is brought to a position to oppose a belt-like space formed in the steel plate by cutting and the steel plate cutter is moved forward along the space, and when the movable arm of the cutter is urged against the cut end face of the steel plate, the arm mounting member integrally movable with the arm pivots relative to the bracket member, and the steel plate cutter is automatically oriented so that it can smoothly move along the belt-like space left by the cut material.

BRIEF DESCRIPTION OF THE DRAWINGS

FIG. 10 is an enlarged plan view of a movable arm;

FIG. 11 is an enlarged side view of a shearing push blade;

FIG. 12 is an enlarged plan view of the shearing push blade of FIG. 11;

FIG. 13. is an enlarged sectional view taken along the line XIII—XIII of FIG. 11;

FIG. 14. is a side view of a steel plate cutter according to a second embodiment of the present invention;

DETAILED DESCRIPTION OF THE PREFERRED EMBODIMENTS

Figure 1:
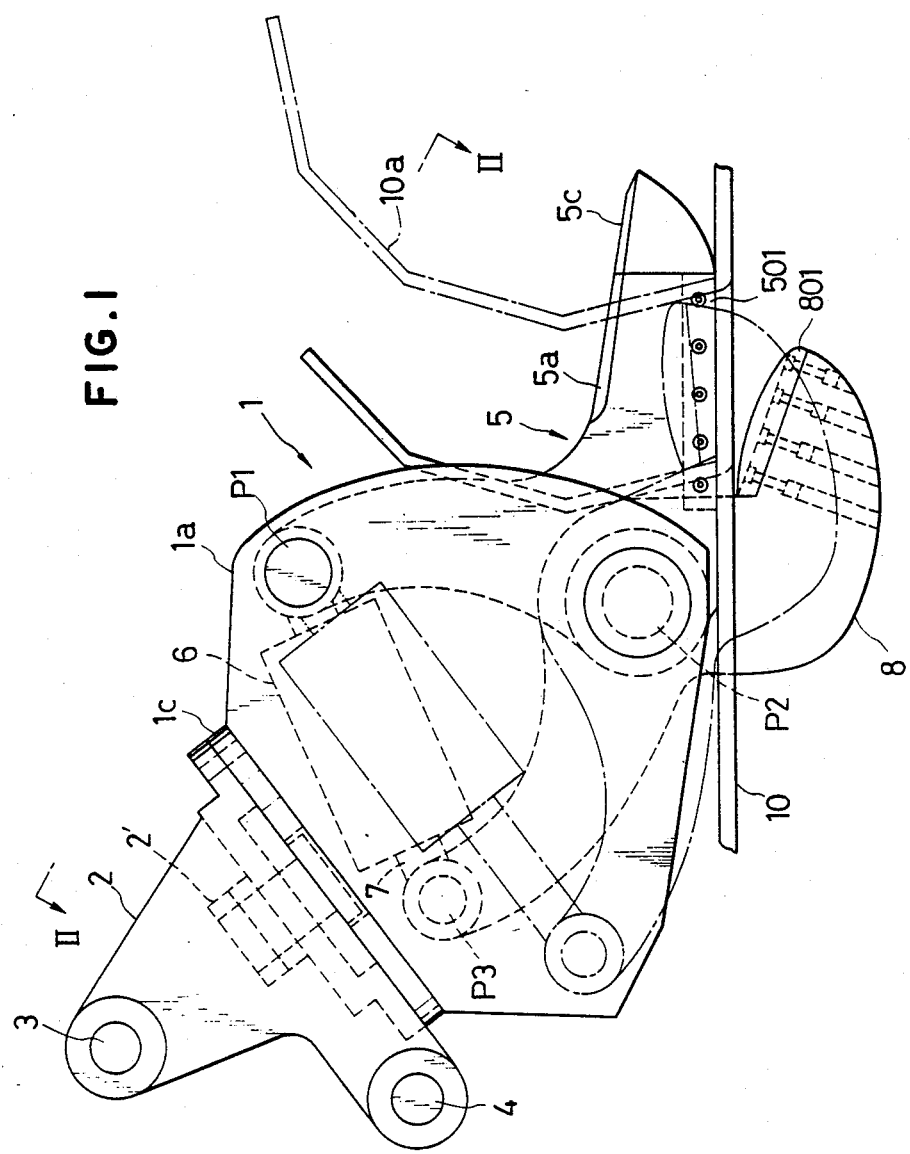
FIG. 1 is a side view of a steel plate cutter according to a first embodiment of the present invention.

FIGS. 1 and, 2 show a steel plate cutter according to a preferred first embodiment of the present invention suitable for use on a construction machine (not shown) such as a power shovel. The cutter has a bracket member 2 which is pivotally mounted on an arm of the construction machine by pins (not shown) inserted in mounting holes 3 and 4 and on a piston rod of a hydraulic cylinder (neither are shown) provided to the construction machine. The cutter is pivotally mounted on the construction machine. A stationary arm 5 is fixed on an arm mounting member 1, fixed on the bracket member 2, by a pin P1 and a main pin P2. The stationary and movable ends of a hydraulic cylinder 6 are pivotally coupled to the pin P1 and a pin P3 fixed to one end of a movable arm 8. The movable arm 8 is pivotally supported by the pin P2 and moves toward and away from the stationary arm 5 as a piston rod 7 of the hydraulic cylinder 6 is moved forward and retracted so as to cut a steel plate 10 by interaction between a shearing push blade 801 fixed on the distal end of the arm 8 and a pair of base blades 501 fixed on the distal end of the stationary arm 5.

The steel plate cutter will be described in detail.

Figure 2:
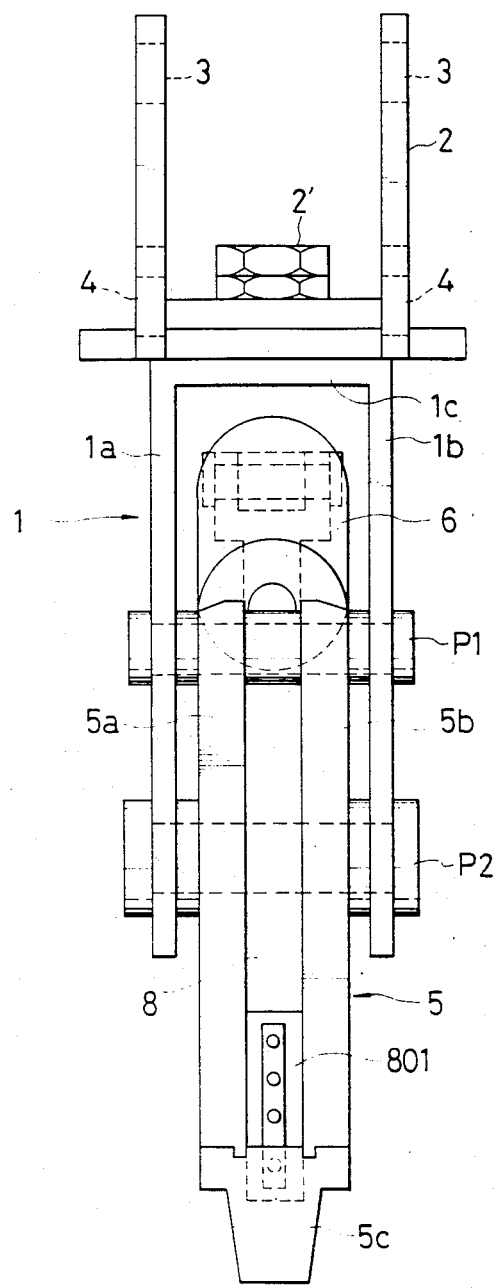
FIG. 2 is a view of the steel plate cutter taken along the line II—II of FIG. 1.

Referring to FIGS. 1 and 2, the arm mounting member 1 fixed on the bracket member 2 by a bolt 2' has side plates 1a and 1b that are coupled to each other by a coupling member 1c. The stationary arm 5 is arranged between the side plates 1a and 1b to extend substantially parallel to the side plates. The arm 5 has a pair of arm members 5a and 5b having L-shaped side surfaces, respectively. The proximal ends of the arm members 5a and 5b are fixed to the pin P1 the ends of which are fixed to side ends of the side plates 1a and 1b. Intermediate bent portions of the arm members 5a and 5b are fixed to the main pin P2 the two ends are fixed to the distal ends of the side plates 1a and 1b. The arm members 5a and 5b are held to be spaced apart from each other by a predetermined gap by a coupling member 5c fixed to the distal end faces thereof.

Figure 3:
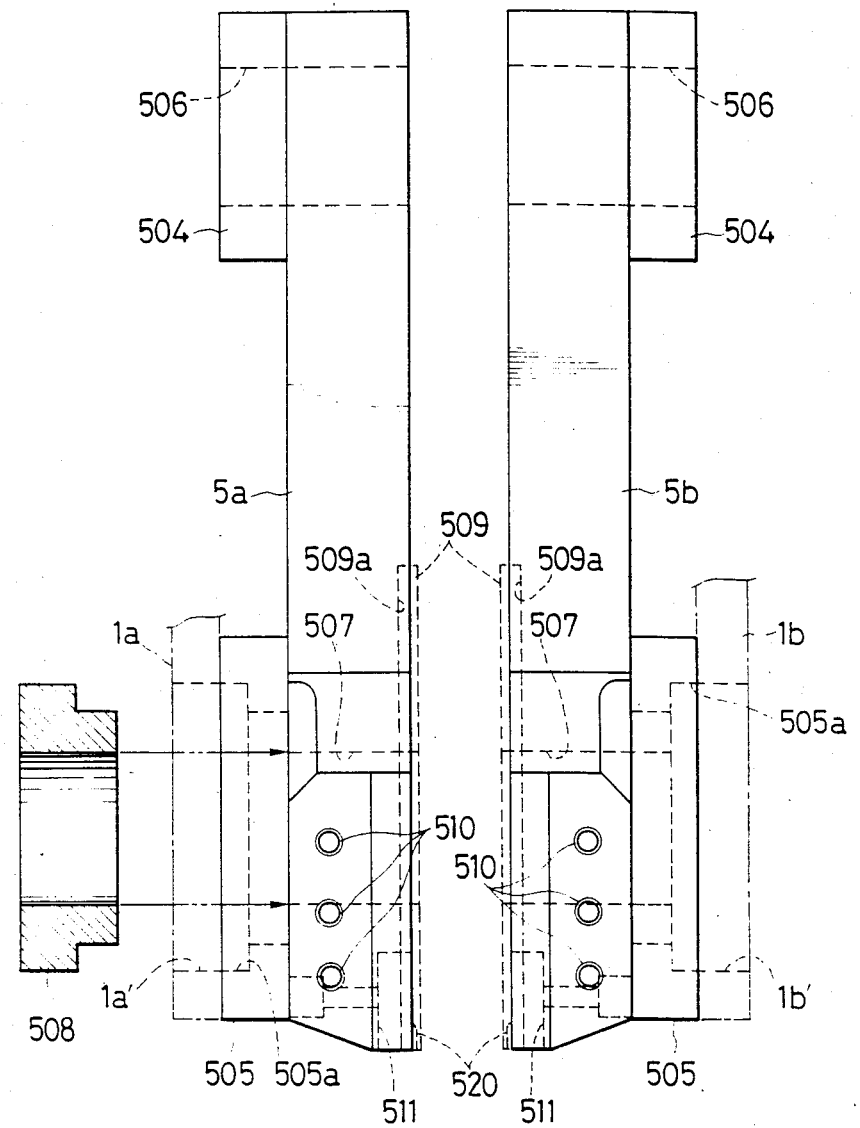
FIG. 3 is an enlarged view of arm members of a stationary arm.
Figure 4:
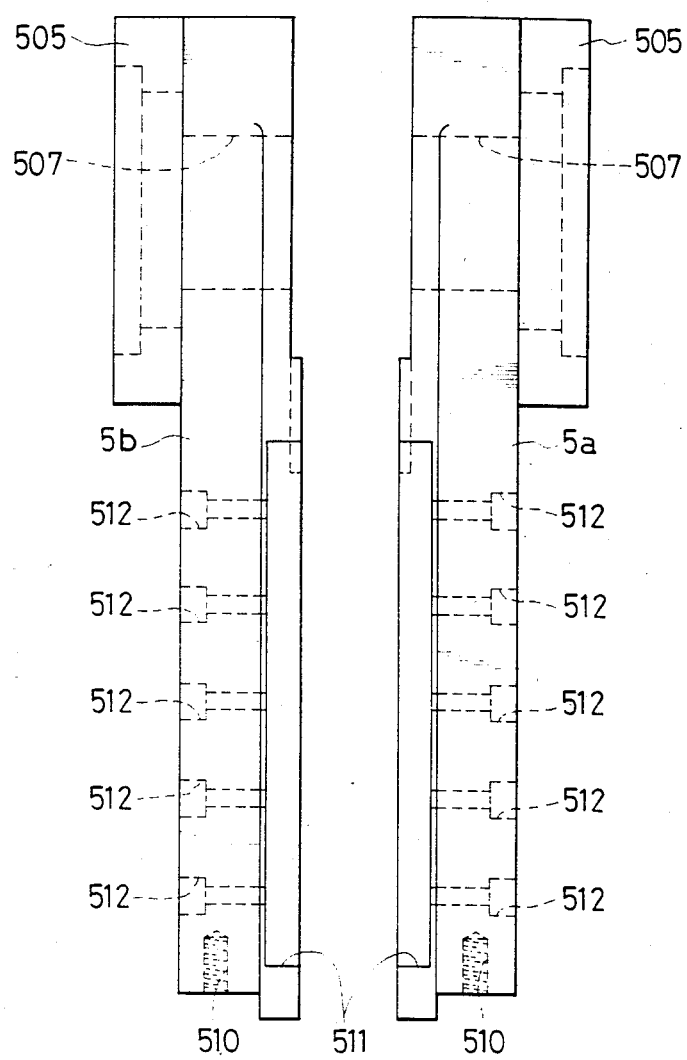
FIG. 4 is an enlarged bottom view of the arm members of FIG. 3

As shown in FIGS. 3 and 4, reinforcing members 504 are respectively welded on the proximal ends of the arm members 5a and 5b. Holes 506 for receiving the pin P1 therein are formed to extend in the proximal ends of the arm members 5a and 5b and the reinforcing members 504, respectively. Reinforcing members 505 are welded on intermediate portions of the arm members 5a and 5b, respectively. Sleeve holes 505a are formed in the respective reinforcing members 505 to be aligned with sleeve holes 1a' and 1b' formed in the side plates 1a and 1b of the arm mounting member 1, respectively. Sleeves (only one of them is indicated as a sleeve 508) are fitted in the sleeve holes 1a' and 505a; and 1b' and 505a. Holes 507 are respectively formed in the arm members 5a and 5b to be aligned with these sleeve holes, and the main pin P2 extends through the sleeve holes 1a', 1b', and 505a, and the holes 507. A spacer 509 is arranged in a groove 509a formed in the inner side surface at the pin P2 insertion position of each of the arm members 5a and 5b so that the movable arm 8 pivots smoothly between the arm members. A plurality of bolt holes 510 are formed in the distal end face of each of the arm members 5a and 5b. The coupling member 5c is fixed to the arm members 5a and 5b by bolts that are inserted in bolt holes 515 (FIGS. 5 to 7), formed in flange portions 514 of the coupling member 5c to be aligned with the bolt holes 510, and threadedly engaged with the bolt holes 510. A groove 511 and bolt holes 512 communicating with it are formed in the bottom face of the distal end of each of he arm members 5a and 5b.

Figure 8:
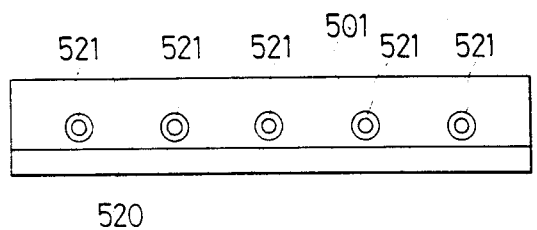
FIG. 8 is an enlarged side view of a base blade.
Figure 9:
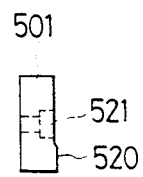
FIG. 9 is an enlarged view showing an end face of the base blade of FIG. 8.

The base blades 501 are fixed in the corresponding grooves 511 by bolts (not shown), extending through the bolt holes 512 (FIGS. 8 and 9) and bolt holes 521 formed in the base blades 501 to be aligned with the bolt holes 512, and nuts (not shown) engaged with the bolts. As best seen in FIG. 9, each base blade 501 has a thick portion 520 on a side thereof opposing the movable arm, and each thick portion projects slightly inwardly with respect to the inner surface of each of the arm members 5a and 5b.

Figure 5:
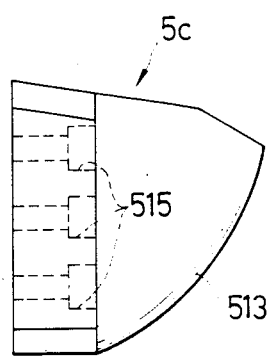
FIG. 5 is an enlarged side view of a coupling member of the stationary arm.
Figure 6:
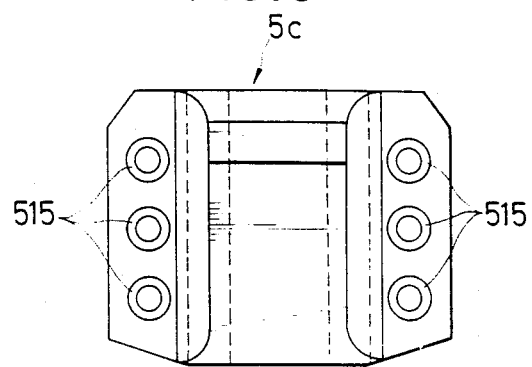
FIG. 6 is an enlarged rear view of the coupling member of FIG. 5.
Figure 7:
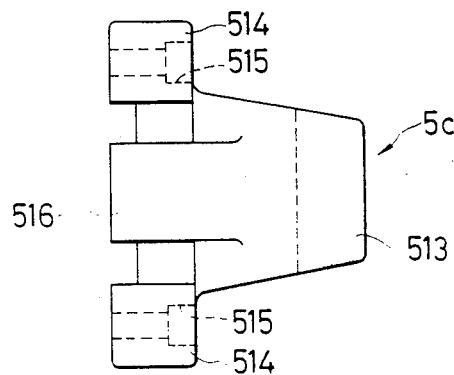
FIG. 7 is an enlarged bottom view of the coupling member of FIG. 5.

Referring to FIG. 5, the coupling member 5c of the stationary arm 5 has an arcuated portion 513, and a surface of the arcuated portion 513 on the movable arm side extends and is arcuated along a direction to be separated from the movable arm 8 and the steel plate 10, so that the stationary arm 5 can smoothly move on the steel plate. A bending fulcrum member 516 is provided on a central portion of the coupling member 5c on the arm member side as best seen in FIG. 7. The bending fulcrum member 516 serves as a fulcrum and guide when a belt-like cut piece of the steel plate 10 is bent toward counter-movable arm side as will be described later.

As shown in FIG. 10, the movable arm 8 consists of a main portio 8' having a thickness slightly smaller than the distance between the arm members 5a and 5b, and an extended portion 802 welded on the proximal end of the main portion 8'. Holes 803 for receiving the pin P3 are formed in the extended portion 802. A hole 804 for receiving the main pin P2 is formed in the intermediate portion of the main portion 8', and a push blade mounting groove 805 and a plurality of bolt holes 806 communicating with the groove 805 are formed in the distal end portion of the main portion 8' Meanwhile, bolt holes 813 are formed in the shearing push blade 801 to communicate with the shallow groove 811 and to be aligned with the bolt holes 806 of the movable arm 8.

The shearing push blade 801 is fixed to the movable arm 8 by bolts (not shown) inserted in the bolt holes 813 and 806 and nuts (not shown) engaging therewith while its projection 814 formed in the surface opposing the groove 805 is fitted in the groove 805. The width of the shearing push blade 801 is slightly smaller than the distance between the thick portions 520 of the pair of base blades 501 of the stationary arm 5. The edge of the shearing push blade 801 on the stationary arm side, as best seen in FIG. 11, has an arcuated section in order to improve the durability of the shearing push blade 801 and to apply on the steel plate 10 a force in the tangential direction of the arcuated edge of the shearing push blade 801 and directed to the proximal end side thereof, in other words, a force to withdraw the steel plate 10 when the steel plate 10 is to be cut. The distal end face 812b of the push blade 801 on the stationary arm side is chamfered round, as indicated by reference numeral 815. The chamfered portion 815 serves to bend the cut piece in a direction to be separated from the push blade 801 when the steel plate is cut. The shallow groove 811 described above is formed in the elongated direction such that it is terminated before two end faces 812a and 812b of the push blade 801 so that the force for cutting the steel plate is concentrated on the two edges of the push blade.

As shown in FIGS. 1 and 2, the hydraulic cylinder 6 is arranged in the arm mounting member 1 on the proximal end side and between the side plates 1a and 1b of the mounting member 1. The stationary end of the cylinder 6 is pivotally coupled to the pin P1, and the movable end of the cylinder 6, that is, the distal end of the piston rod 7 is pivotally coupled to the pin P3 fixed to one end of the movable arm 8.

The operation of the steel plate cutter having the above arrangement will be described.

The hydraulic cylinder 6 is driven to move the piston rod 7 backward, i.e., to retract and to thereby separate the movable arm 8 from the stationary arm 5, as indicated by the solid line in FIG. 1. In this state, the steel plate 10 is inserted between the pair of base blades 501 of the stationary arm 5 and the shearing push blade 801 of the movable arm 8. Subsequently, the positions of the construction machine and its arm with respect to the steel plate 10, and the pivotal angle of the steel plate cutter with respect to the arm are adjusted and the bottom surfaces of the base blades 501 are brought into tight contact with one surface of the steel plate 10. Then, when the piston rod 7 of the cylinder 6 is moved forward, the movable arm 8 is pivoted around the main pin P2 counterclockwise in FIG. 1, and the shearing push blade 801 of the arm 8 is abutted against the other surface of the steel plate 10 and is further pivoted toward the stationary arm side. As a result, by the two edges of the shearing push blade 801 and the edges of the thick portions 520 of the pair of base blades 501, a shearing force acts on two portions of the steel plate 10 opposing these edges, and the steel plate 10 is cut in a belt-like manner. In the final stage of the cutting operation, when the distal end portion 812b of the shearing push blade 801 has entered the space between the thick portions 520 of the base blades 501, a belt-like cut piece 10a of the steel plate 10 is urged and bent toward the counter-movable arm side about the bending fulcrum base 516 of the stationary arm 5 as the fulcrum by the distal end portion 812b of the push blade 801, as shown in FIG. 1. As a result, a belt-like space, which has a width larger than that of the movable arm 8 and in and from which the movable arm 8 can freely enter and escape, is formed in the cut steel plate 10.

When the steel plate 10 is cut in a belt-lie manner, the piston rod 7 of the cylinder 6 is moved backward to separate the movable arm 8 from the stationary arm 5 so that the distal ends of the movable and stationary arms 8 and 5 are separated. Subsequently, the bottom surfaces of the base blades 501 of the stationary arm 5 or the bottom surface of the arcuated portion 513 of the stationary arm 5 is brought into tight contact with the surface of the steel plate 10 and the proximal end of the movable arm 8 is made to oppose the belt-like space formed in the steel plate 10 by the previous cutting operation. In this state, the steel plate cutter is moved forward along the belt-like space for a distance substantially equal to the length of the base blade 501. The above-described cutting operation is repeated. Thereafter, the same cutting operation is repeated for a required number of times, and the cutting of the steel plate 10 is completed. Since the belt-like cut piece 10a of the steel plate 10 is bent by every cutting operation, it is formed in a roll-like manner.

In the above embodiment, thick portions are provided to the base blades 501 on the bottom sides thereof. However, the entire base blades can be formed thick so that the base blades constitute steps together with the inner sides of the arm members 5a and 5b. Alternatively, tapered portions can be formed in the arm members 5a and 5b and one or both of the base blades 501 so that the distance between the arm member 5a and the base blade 501 and that between the arm member 5b and the base blade 501 are gradually decreased toward the bottom surface side of the base blades. In the above embodiment, the stationary arm 5 is provided independently of the arm mounting member 1. However, the stationary arm 5 can be integrally provided with the arm mounting member 1.

Figure 15:
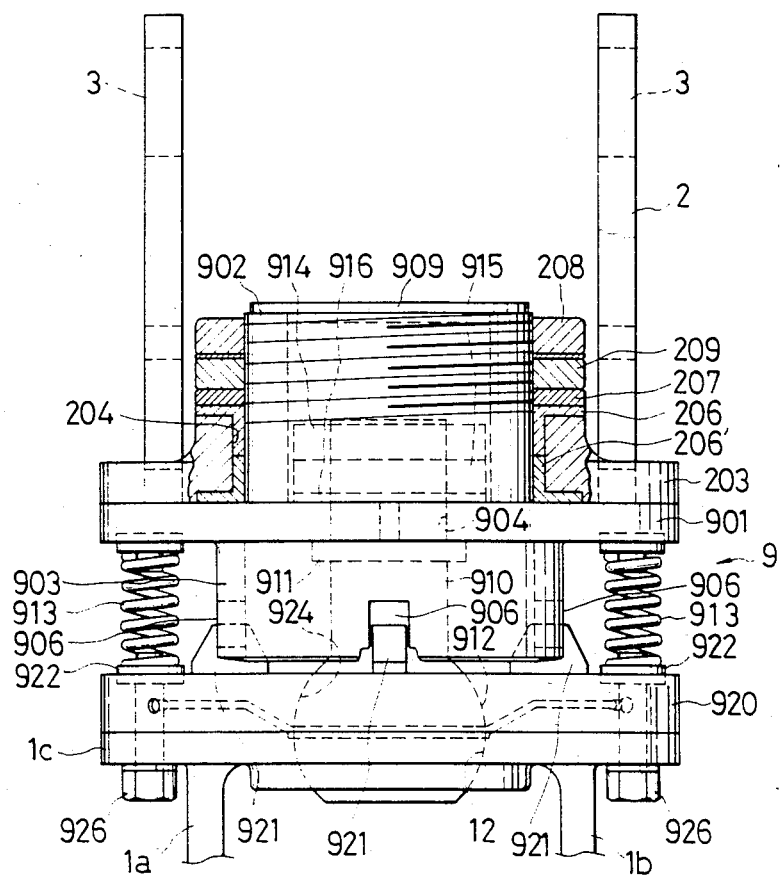
FIG. 15 is a partially sectional enlarged side view of the embodiment of FIG. 14, showing a flexible joint and its peripheral arrangement.

FIGS. 14 and 15 illustrate a steel plate cutter according to a second embodiment of the present invention. The cutter of this embodiment is the same as that of the first embodiment except that its arm mounting member 1 is pivotally coupled to a bracket member 2 through a flexible joint 9. The common portions in the both embodiments are denoted by the same reference numerals and an explanation thereof is omitted.

The flexible joint 9 consists of a first mounting plate 901 arranged on the arm mounting member side of the bracket member 2, a second mounting plate 920 arranged on the bracket member side of a coupling 1c of the arm mounting member 1, a shaft member 901 for coupling the bracket 2 to the arm mounting member 1, and a plurality of springs 913 inserted between these mounting plates 901 and 920.

Figure 16:
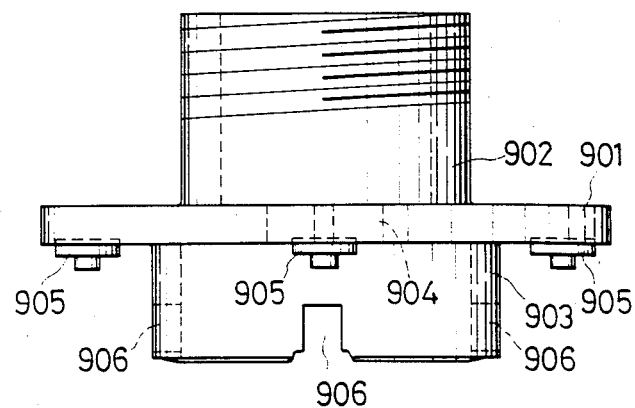
FIG. 16 is an enlarged side view of a first mounting plate of the embodiment of FIG. 14 and its peripheral arrangement.
Figure 17:
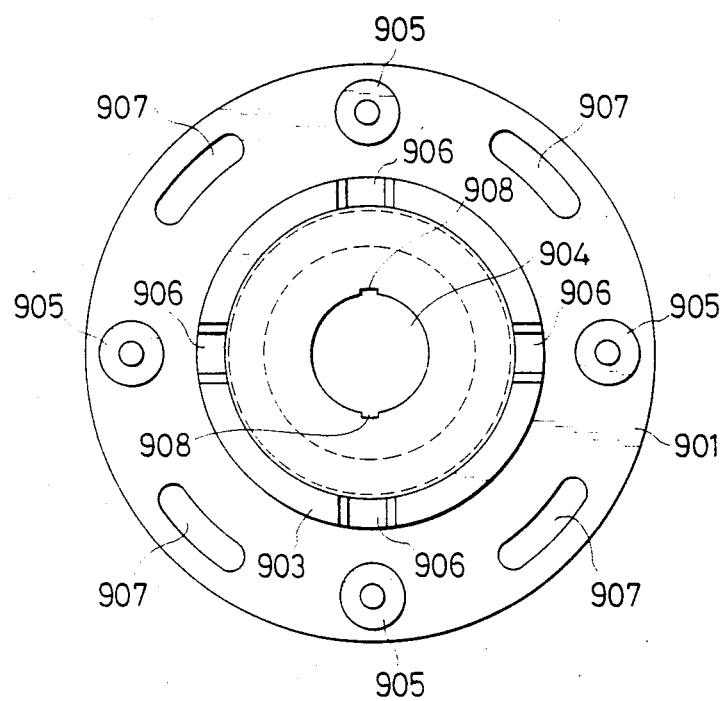
FIG. 17 is an an enlarged bottom view of the first mounting plate of the embodiment of FIG. 14
Figure 20:
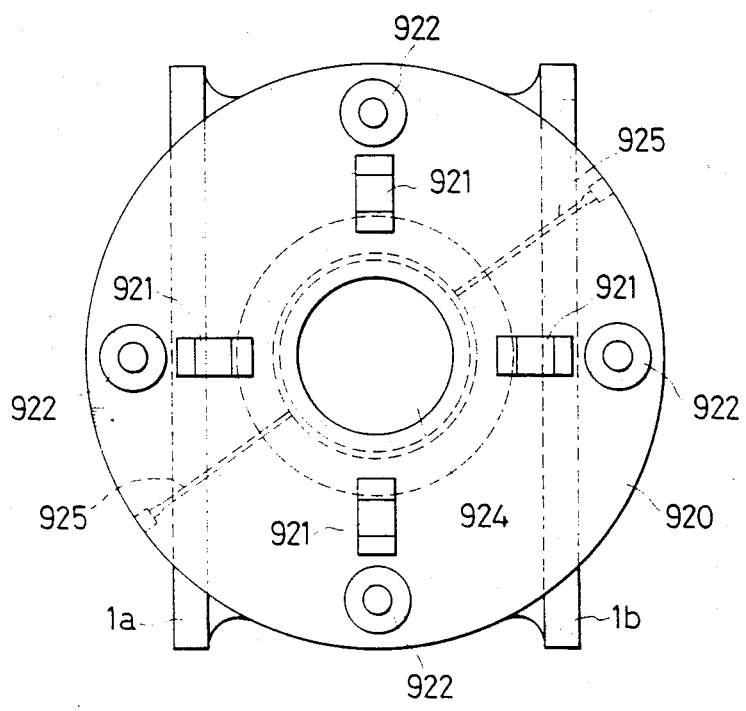
FIG. 20 is an enlarged plan view of the second mounting plate of the embodiment of FIG. 14.

A hole 904 is formed in the central portion of the first mounting plate 901 so as to receive the shaft member 910. A hollow cylindrical stationary member 902 and a cylindrical stopper member 903 are aligned with the hole 904 and fixed to the surfaces of the plate 901 on the arm mounting member side and a side opposite thereto, respectively. The stopper member 903 serves to regulate the range of the pivoting angle of the arm mounting member 1 with respect to the bracket member 2. The peripheral edge of the distal end face of the stopper member 903 is chamfered in a tapered manner (FIGS. 16 and 17). Thus, when the arm mounting member 1 is pivoted, it is brought into surface contact with the stopper member 903. Four engaging grooves 906, arm mounting member sides of which have larger sizes, are formed in the distal end face of the stopper member 903 at equal angular intervals of 90°. The engaging grooves 906 are engaged with corresponding projections 921 (FIG. 20) formed in the second mounting plate 920 so that the first and second mounting plates 901 and 920 cannot rotate relative to each other. This prevents a torsion force from acting on the springs 913. Four spring bases 905 for supporting the springs 913 are fixed on the periphery of the first mounting plate 901 at equal angular intervals of 90° and support the spring 913 together with spring bases (to be described later) on the second mounting plate 920 side. Four elongated holes 907 are formed in the first mounting plate 901 to coincide with the spring bases 905 and at angular intervals of 90° (FIG. 17).

An annular base plate 203 is provided to the bracket member 2 on the counter-arm mounting member side. The hollow cylindrical stationary member 902 is housed in a large-diameter stepped hole 204 in the base plate 203 through bushings 206 and 206'. A threaded portion is formed in the end portion of the outer surface of the stationary member 902 on the counter-arm mounting member side. The stationary member 902 is clamped to the base plate 203 with nuts 208 and 209 engaging with the threaded portion so that the bracket member 2 is fixed on the first mounting plate 901. Reference numeral 207 denotes a washer. An end portion of the shaft member 910 on the bracket side, i.e., the threaded portion, projects in the hollow portion of the stationary member 902. The shaft member 910 is clamped to and fixed on the mounting plate 901 by nuts 914 and 915 engaged with the threaded portion while a flange portion 911 welded on an intermediate portion thereof is abutted against a surface of the first mounting plate 901 on the arm mounting member side. Reference numeral 916 denotes a washer, and 909 is a lid for sealing the hole of the stationary member 902.

Figure 18:
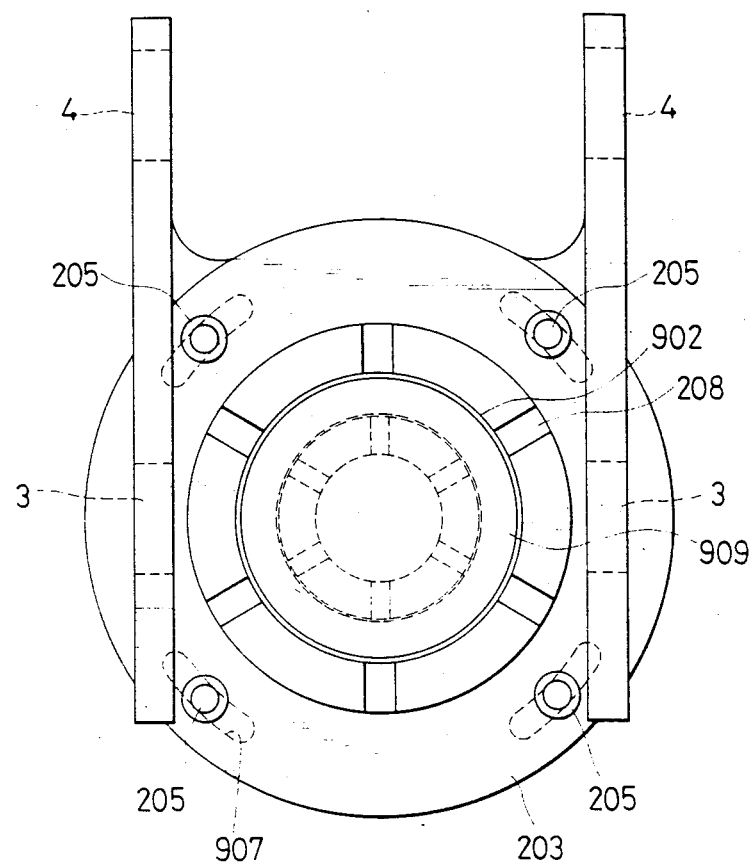
FIG. 18 is an enlarged view of the steel plate cutter of the embodiment of FIG. 14 seen along the line XVIII—XVIII of FIG. 14.

Four bolt holes (not shown) are formed in the periphery of the bottom plate 203 to be aligned with the elongated holes 907 in the mounting plate 901. The first mounting plate 901 is coupled to the bracket member 2 by four bolts 205 (FIG. 18) inserted in these bolt holes, respectively, such that the plate 901 is pivotal through a predetermined angle with respect to the bracket member 2. As a result, when a rotating force exceeding a predetermined value is applied on the mounting plate 901, the mounting plate 901 is pivoted relative to the bracket member 2 through an angle within a predetermined range.

Figure 19:
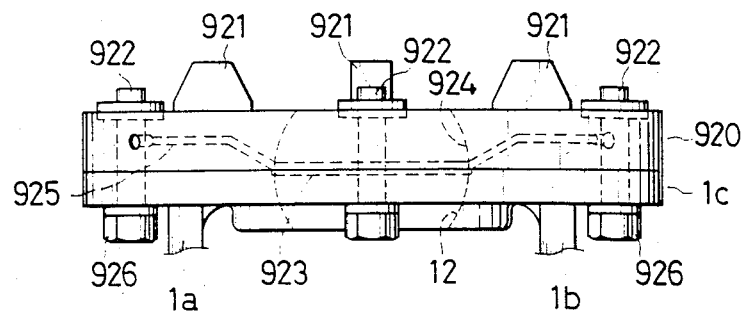
FIG. 19 is an enlarged side view of a second mounting plate of the embodiment of FIG. 14 and coupling member of an arm mounting member fixed on it.

In addition to the projections 921 described above, a hemispherical hole 924, best seen in FIG. 19, is formed at a central portion of a surface of the second mounting plate 920 on the bracket member side. The hole 924, together with a hemispherical hole 12 formed in the coupling member 1c of the arm mounting member 1, as best seen in FIG. 15, constitutes a spherical hole in which a spherical coupling portion 912 of the shaft member 910 is fitted and which has its maximum diameter at its interface surface of the mounting plate 920 and the coupling member 1c. Oil grooves 923 are formed in the opposing surfaces of the mounting plate 920 and the coupling member 1c so as to face the spherical hole. The oil grooves communicate with lubricating holes 925 (FIGS. 19 and 20) formed in the mounting plate 920 in order to allow lubrication from outside. Four holes are formed in the peripheries of the second mounting plate 920 and the coupling member 1c of the arm mounting member 1, respectively. The mounting plate 920 is fixed to the arm mounting member 1 by four bolts 922 inserted in these holes and nuts engaged with the bolts 922. Spring bases for receiving the springs 913 are formed in the end portions of the bolts on the bracket member side, respectively.

Assembly of the steel plate cutter according to the second embodiment will be described.

First, a spherical coupling portion 912 of the shaft member 910 is inserted in a hole 12 in the coupling member 1c of the arm mounting member 1. A portion of the shaft member 910 on the counter-coupling portion side is inserted in the hole 924 of the second mounting plate 920. The coupling portion 912 of the shaft member 910 is fitted in the hole 12 of the coupling member 1c and the hole 924 in the mounting member 920. The coupling member 1c and the mounting plate 920 are fixed to each other by the bolts 922 and nuts 926, and the shaft member 910 is fitted on the coupling member 1c and the mounting plate 920. Subsequently, one end of each of the four springs 913 is supported on the spring base of the corresponding bolt 922. In this state, the shaft member 910 is inserted in the hole 904 in the first mounting plate 901, the other end of each of the springs 913 is supported on the corresponding spring base 905, and the engaging grooves 906 of the stopper member 903 of the mounting plate 901 are engaged with the projections 921 of the mounting member 920.

The shaft member 910 is non-pivotally fixed to the mounting plate 901 by keys fitted in the key grooves 908 formed in the hole 904 of the first mounting plate 901. The washer 916 is fitted on the shaft member 910 and the flange portion 911 of the shaft member 910 is abutted against the bracket member 2. In this state, the shaft member 910 is fixed to the mounting plate 901 by the nuts 914 and 915 engaged with the threaded portion of the shaft member 910. The bushings 206 and 206' are fitted in the hole 204 in the bottom plate 203 of the bracket member 2, thereafter the stationary member 902 is arranged inside the bushings 206 and 206', and the washer 207 is fitted on the stationary member 902. The stationary member 902 is fixed on the mounting plate 901 by the nuts 208 and 209 engaged with the threaded portion of the stationary member 902. The bolts 205 are inserted in the holes in the bracket member 2 and the elongated holes 907 in the mounting plate 901, and the bracket member 2 is clamped with and fitted on the mounting plate 901 by nuts engaged with the bolts 205. Finally, a lid 909 is fixed on the stationary member 902 by set screws.

The operation of the steel plate cutter according to the second embodiment of the present invention will now be described.

First, as is described for the steel plate cutter of the first embodiment, the positions of the construction machine and the attached writter assembly are adjusted so that the bottom surface of the stationary arm 5 is brought into tight contact with one surface of the steel plate 10. When the stationary arm 5 is urged against the steel plate 10, a reaction force from the steel plate 10 acts on the coupling member 1c of the arm mounting member 1 and the second mounting plate 920 through the stationary arm 5. These elements 1c and 920, which are supported by the spherical coupling portion 912 of the shaft member 910 to be capable of pivoting, compress the springs 913 arranged on one side of the cutter, extend the springs 913 on the other side of the cutter, and pivot with respect to the spherical coupling portion 912. As a result, both of the pair of base blades 501 arranged on the bottom surface side of the stationary arm 5 are reliably brought into tight contact with the opposing surface of the steel plate 10. Thereafter, the steel plate 10 is cut in the manner as described for the steel plate cutter of the first embodiment, and the belt-like cut piece 10a of the steel plate is bent in a roll-like manner.

When a single cutting operation is completed, the steel plate cutter is moved along a space formed in the steel plate 10 by cutting while the proximal end of the movable arm 8 faces the space. In this case, when the proximal end of the movable arm 8 of the steel plate cutter is urged against either cut face of the steel plate 10, a reaction force from the plate 10 acts on the arm mounting member 1, the second mounting plate 920, the stopper member 903, and the first mounting plate 901 through the movable arm 8. As a result, the elements 1c and 920 pivot around the shaft member 910, as described above. When the urging force is large, the first and second mounting plates 901 and 920 and the arm mounting member 1 are rotated about the shaft member 910 within an angular range corresponding to the length of each of the elongated holes 907 in the first mounting place 901. As a result, the direction of the steel plate cutter with respect to the belt-like space in the steel plate is changed, and the urging force disappears. In other words, the steel plate cutter can smoothly move within the belt-like space in the steel plate 10.

In this embodiment, four springs are arranged at equal angular intervals. However, the present invention is not limited to this. A larger number of springs can be arranged, or a single spring having a large diameter can be fitted on the shaft member. Alternatively, springs can be arranged in the vicinity of the side plates 1a and 1b of the arm mounting member 1, on which a large force acts, and in a number larger than that of the springs arranged at other portions.

In this embodiment, the spherical coupling portion 912 of the shaft member is arranged on the side of the arm mounting member 1 and the second mounting plate 920. However, it can be arranged on the side of the bracket member 2 and the first mounting plate 901. In this case, spherical holes fitted with the spherical coupling portion of the shaft member are formed in the bottom plate 203 of the bracket member and in the first mounting plate 901, and one end of the shaft member on the counter-spherical coupling portion side is fastened and fixed to the coupling member 1c of the arm mounting member 1 and the second mounting plate 920 by nuts. Furthermore, elongated holes corresponding to the elongated holes 907 in the first mounting plate 920 are formed in the coupling member 1c or the second mounting plate 920, and these elements 1c and 920 are coupled to each other to be rotatable relative to each other by bolts inserted in these elongated holes.

The preceding disclosure is set forth to demonstrate specific embodiments of the present invention and are not intended to limit the scope of the claimed invention. Additional embodiments and advantages within the scope of the presently claimed invention will be apparent in view of the appended claims.

We claim:

1. A steel plate cutter, comprising:
   a stationary arm having a pair of arm members arranged with a predetermined gap therebetween;
   a movable arm arranged between said arm members and pivotally supported at an intermediate portion thereof by said arm members;
   a hydraulic cylinder, having a piston rod capable of moving forward and backward, for driving said movable arm to approach and separate from said stationary arm, said cylinder having a stationary end pivotally coupled to proximal ends of said arm members, said piston rod having a distal end pivotally coupled to a proximal end of said movable arm;
   a shearing push blade fixed to distal ends of said arm;
   a pair of base blades fitted to distal ends of said arm members to oppose said shearing push blade, wherein said shearing push blade is capable of entering and escaping from a space between said base blades and, upon sliding between said base blades, cuts a steel plate in a belt-like manner by a shearing force together with said base blades; and
   a bracket member for mounting said steel plate cutter on a construction machine, an arm mounting member on which said stationary arm is fixed, and a flexible joint for mounting said arm mounting member on said bracket member to be capable of pivoting wherein said flexible joint comprises a shaft member having one end fixed to either said arm mounting member or said bracket member and the other end having a first coupling portion and spring means provided between said arm mounting member and said bracket member and arranged around said shaft member,
   said first coupling portion of said shaft member being coupled to a second coupling portion formed on the remaining one of said arm mounting member and said bracket member to be capable of pivoting and
   one of said first and second coupling portions comprising a spherical coupling member, a spherical hole fitted with said spherical coupling member being formed in the remaining one of said coupling portions.

2. A steel plate cutter according to claim 1, wherein said stationary arm includes a coupling member, fixed to distal end faces of said pair of arm members, for holding said arm members with the predetermined gap therebetween.

3. A steel plate cutter according to claim 2, wherein a round chamfered portion is formed in a distal end face of said shearing push blade on a stationary arm side, so that a cut piece of a steel plate is bent in a direction to be separated from the steel plate.

4. A steel plate cutter according to claim 3, wherein a bending fulcrum member is provided on said coupling member on a side near said arm members, so that said steel plate cut piece is bent about said bending fulcrum member as a fulcrum.

5. A steel plate cutter according to claim 1, wherein thick portions are provided on edges of said base blades on a movable arm side to project slightly inward with respect to inner side surfaces of corresponding ones of said pair of arm members, respectively, and a distance between said thick portions is set to be slightly larger than a width of the distal end of said movable arm and of said shearing push blade fixed to said movable arm.

6. A steel plate cutter according to claim 1, wherein an edge of said shearing push blade on a stationary arm side is formed to have an arcuated section.

7. A steel plate cutter according to claim 1, wherein said flexible joint includes a first mounting plate provided to said bracket member on an arm mounting member side, and a second mounting plate provided to said arm mounting member on a bracket member side, and said spring means is arranged between said first and second mounting plates.

8. A steel plate cutter according to claim 7, wherein said stationary arm includes a coupling member, fixed to distal end faces of said pair of arm members, for holding said arm members with the predetermined gap therebetween, hemispherical holes are formed in said coupling member and said second mounting plate for constituting said spherical hole in cooperation with each other, one end of said shaft member is fixed to said first mounting plate, and said spherical coupling member is formed on the other end of said shaft member.

9. A steel plate cutter according to claim 8, wherein a through hole is formed at a central portion of said bracket member, an elongated hole is formed in either said bracket member or said first mounting plate, and said steel plate cutter further includes means for fixing a central portion of said first mounting plate to said shaft member, a stationary member which has a threaded portion at an end thereof on a counter-first mounting plate side and which is fitted in said through hole, means for fixing said stationary member on said first mounting plate, a nut, engaged with said threaded portion of said stationary member, for clamping and fixing said bracket member to said first mounting plate through said stationary member, and a coupling member extending through said elongated hole in either said bracket member or said first mounting plate, and through the remaining one of said bracket member and said first mounting plate, whereby said bracket member is mounted to be pivotal with respect to said first mounting plate through an angular range corresponding to a length of said elongated hole.

10. A steel plate cutter according to claim 1, wherein said stationary arm includes a coupling member, fixed to distal end faces of said pair of arm members, for holding said arm members with the predetermined gap therebetween.

11. A steel plate cutter according to claim 10, wherein a round chamfered portion is formed in a distal end face of said shearing push blade on a stationary arm side, so that a cut piece of the steel plate is bent in a direction to be separated from the steel plate.

12. A steel plate cutter according to claim 11, wherein a bending fulcrum member is provided on said coupling member on a side near said arm members, so that said steel plate cut piece is bent about said bending fulcrum member as a fulcrum.

13. A steel plate cutter according to claim 1, wherein thick portions are provided on edges of said base blades on a movable arm side to project slightly inward with respect to inner side surfaces of corresponding ones of said pair of arm members, respectively, and a distance between said thick portions is set to be slightly larger than a width of the distal end of said movable arm and of said shearing push blade fixed to said movable arm.

14. A steel plate cutter according to claim 1, wherein an edge of said shearing push blade on a stationary arm side is formed to have an arcuated section.

* * * * *